Patented Feb. 4, 1936

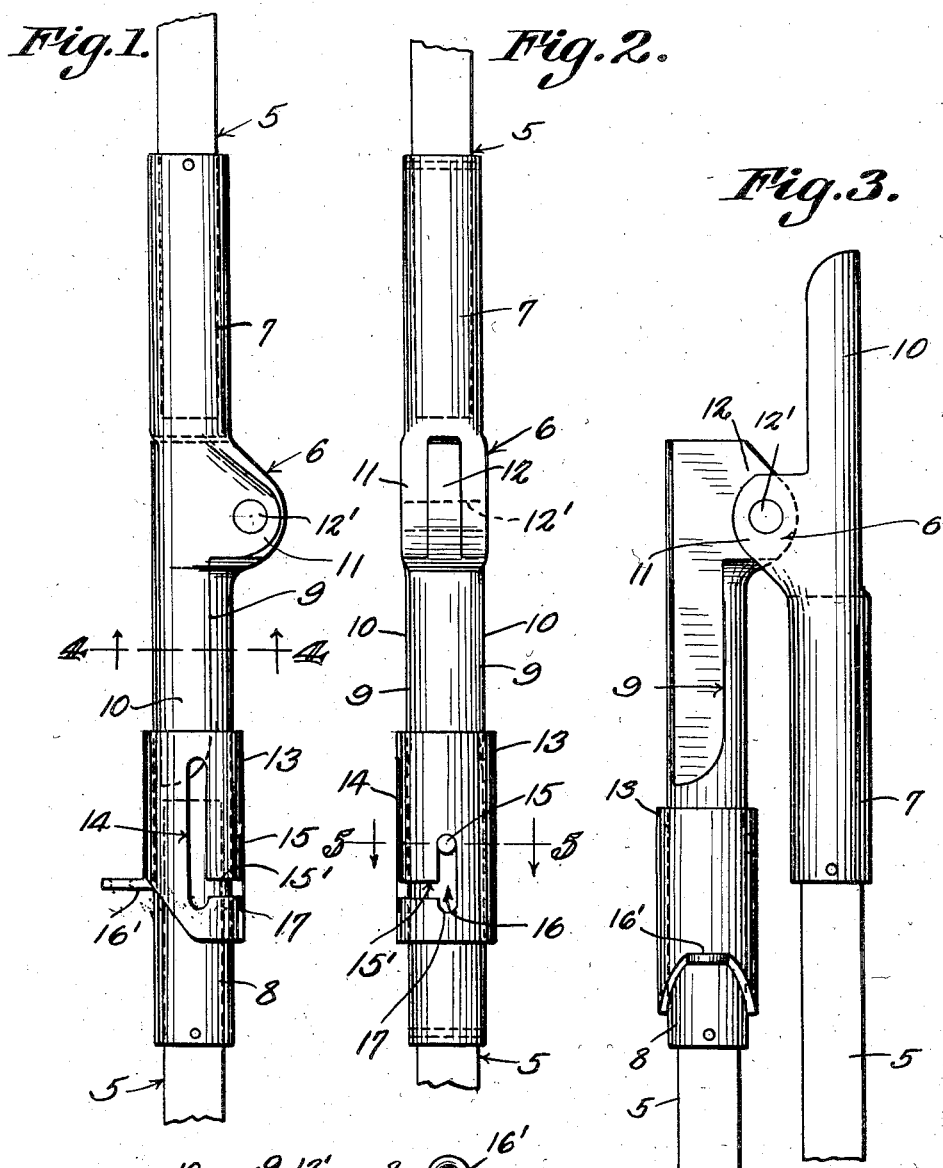

2,029,484

UNITED STATES PATENT OFFICE 2,029,484

FISHING ROD

John R. Howard and Boyd Biggers, Concord, N. C.

Application March 18, 1933, Serial No. 661,601

1 Claim. (Cl. 287—98)

This invention relates to fishing rods or poles, the primary object of the invention being to provide a fishing rod embodying a plurality of pivoted sections, so constructed that the fishing rod may be readily folded into a small and compact article, and one which when extended, will be exceptionally strong and durable, and capable of withstanding severe strain to which a fishing rod may be subjected, without danger of the sections becoming disconnected.

An important object of the invention is to provide a hinge joint for connecting the sections of the rod, which will be securely braced against lateral strain that would otherwise tend to twist or distort the pivotal connections between the rod sections.

A still further object of the invention is to provide a connection for fishing rod sections, which will hold the sections of the rod together at all times, the connecting means being free of screws, springs, bolts or other similar securing means, which wear and render the rod inoperative.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental elevational view of a fishing rod constructed in accordance with the invention.

Figure 2 is an elevational view of a fishing rod, taken at right angles to Figure 1.

Figure 3 is an elevational view illustrating adjacent sections of a fishing rod as folded.

Figure 4 is a sectional view taken on line 4—4 of Figure 1.

Figure 5 is a sectional view taken on line 5—5 of Figure 2.

Referring to the drawing in detail, the fishing rod embodies a plurality of sections 5, the sections being hingedly connected by means of the hinges indicated generally by the reference character 6.

Each of these hinges comprises a pair of tubular sections 7 and 8 respectively, the tubular section 8 of each hinge member, being fitted over one end of the rod section with which it is associated.

The hinge section 8 is provided with lateral cut out portions defining shoulders 9, that extend longitudinally of the section, the shoulders providing stops for the fingers 10 of the hinge, the fingers operating on opposite sides of the tubular section 8, as clearly shown by the drawing.

As shown, the sections 7 and 8 are provided with enlarged portions 11 and 12, which enlarged portions are formed with openings to receive the pivot pin 12', that pivotally connects the sections of the hinge.

Thus it will be seen that due to this construction, the sections are free to pivot in one direction, but restricted from pivotal movement in the opposite direction.

Forming a part of each hinge section, is a locking sleeve 13, which is slidably mounted on the section 8 of the hinge, the sleeve being formed with a bayonet slot 14 that accommodates the pin 15, extending from the tubular section 8, so that when the locking sleeve 13 is moved to its active position, over the fingers 10, the sleeve will be held against movement or accidental displacement.

The bayonet slot 14 formed in the sleeve 13, is of a novel construction, and as shown, is provided with an offset portion 16 communicating with the slot 14, through the slot 15', to the end that when the sleeve has been moved to the position as shown by Figure 2 of the drawing, the hinge will be held in its extended position.

One end of the offset portion 16 of the bayonet slot 14, extends beyond the slot 15' and provides a safety lock with the pin 15 to hold the sleeve, should the sleeve be accidentally slid rearwardly along the rod.

Thus it will be seen that when the sleeve 13 has been moved to its active position, the hinge will be securely locked, to prevent pivotal movement thereof.

Extending laterally from each sleeve 13 is an ear 16, which is formed with an opening providing a guide for the fishing line, which is wound on a reel, carried adjacent to the grip of the rod.

While the hinge connecting two of the sections of a fishing rod, has been described, it is to be understood that the adjacent ends of the other sections of the rod are connected by a hinge of a construction identical with that described.

From the foregoing it will be obvious that due to this construction, the sections of the rod may be readily swung from their extended positions to their folded positions, whereupon the rod may be conveniently carried or stored.

Having thus described the invention what is claimed is:

In a fishing rod, a plurality of sections, a hinge member pivotally connecting the adjacent ends of the sections, said hinge member comprising pivotally connected sections, one section of said hinge member having longitudinal cut-out portions disposed on opposite sides thereof and providing longitudinal shoulders, the opposite section of said hinge member having a central longitudinal cut-out portion defining lateral fingers, the sections of said hinge member being pivotally connected whereby the fingers of one section move through the longitudinal cut-out portion and engage the longitudinal shoulders bracing the sections, and a sleeve movable over the fingers holding the fingers into engagement with the longitudinal shoulders.

JOHN R. HOWARD.
BOYD BIGGERS.